United States Patent [19]

Goto et al.

[11] Patent Number: 5,348,808
[45] Date of Patent: Sep. 20, 1994

[54] HARD SINTERED BODY CUTTING TOOL

[75] Inventors: Mitsuhiro Goto; Tetsuo Nakai, both of Hyogo, Japan

[73] Assignee: Sumitomo Electric Industries, Ltd., Osaka, Japan

[21] Appl. No.: 67,424

[22] Filed: May 25, 1993

[30] Foreign Application Priority Data

Jan. 7, 1993 [JP] Japan .................. 5-1323

[51] Int. Cl.$^5$ ............................... B22F 7/06
[52] U.S. Cl. .................. 428/552; 428/551; 428/565; 428/568; 428/569; 428/539.5; 75/236; 75/237; 75/238
[58] Field of Search ............... 428/547, 548, 551, 552, 428/553, 557, 564, 565, 567, 568, 569, 539.5; 75/236, 237, 238, 239, 240, 248, 249

[56] References Cited

U.S. PATENT DOCUMENTS

| | | | |
|---|---|---|---|
| 4,389,465 | 6/1983 | Nakai et al. | 428/698 |
| 4,403,015 | 9/1983 | Nakai et al. | 428/565 |
| 4,686,080 | 8/1987 | Hara et al. | 419/8 |
| 4,693,746 | 9/1987 | Nakai et al. | 75/238 |
| 4,880,707 | 11/1989 | Kohno et al. | 428/565 |
| 4,890,782 | 1/1990 | Nakai et al. | 228/112 |
| 4,911,756 | 3/1990 | Nakai et al. | 75/238 |
| 4,950,557 | 8/1990 | Nakai et al. | 428/698 |
| 4,959,929 | 10/1990 | Burnand et al. | 51/307 |
| 5,037,704 | 8/1991 | Nakai et al. | 428/550 |
| 5,041,399 | 8/1991 | Fukaya et al. | 501/87 |
| 5,092,920 | 3/1992 | Nakai et al. | 75/238 |

OTHER PUBLICATIONS

Perry, Robert H. & Cecil H. Chilton, ed., *Chemical Engineers Handbook*, 1973, inside cover.

*Primary Examiner*—Donald P. Walsh
*Assistant Examiner*—Chrisman D. Carroll
*Attorney, Agent, or Firm*—W. G. Fasse; W. F. Fasse

[57] ABSTRACT

In a hard sintered cutting tool, the tool life can be further increased. In this hard sintered body cutting tool, a rake face of an edge portion is formed by a major surface of a first sintered body layer containing at least 80 percent by volume and less than 98 percent by volume of diamond, while a flank of the edge portion is formed by a second sintered body layer containing at least 30 percent by volume and less than 75 percent by volume of cubic boron nitride (CBN). The first sintered body layer is formed to have a thickness of at least 0.02 mm and less than 0.1 mm, and to be in a thickness ratio of at least 1:5 to the second sintered body layer. Thus, chipping resistance of the rake face is improved by the first sintered body layer, while wear resistance of the flank is improved by the second sintered body layer. As a result, it is possible to suppress progress of local wear and chipping, whereby the life of the cutting tool is increased as compared with the prior art.

4 Claims, No Drawings

HARD SINTERED BODY CUTTING TOOL

BACKGROUND OF THE INVENTION

1. Field of the Invention

The present invention relates to a hard sintered body cutting tool, and more specifically, it relates to a hard sintered body cutting tool which is made of cubic boron nitride (CBN) and diamond.

2. Description of the Background Art

Diamond is a hard material which is most excellent in thermal conductivity. In general, therefore, a diamond sintered body which is prepared by sintering diamond particles under a very high pressure is widely applied in cutting tools. Such a diamond sintered body is employed for cutting a nonferrous metal such as an aluminum alloy, in particular. On the other hand, a sintered body of CBN (cubic boron nitride), which is next to diamond in hardness, is mainly employed for cutting a ferrous material.

While a diamond sintered body is widely employed for cutting a nonferrous metal such as an aluminum alloy as described above, wear resistance of such a diamond sintered body is extremely reduced when the same is used for cutting a ferrous material such as cast iron or hardened steel, for example, due to reaction of the diamond particles with iron.

Further, when a CBN sintered body, which is mainly employed for cutting a ferrous material as described above, is used for cutting an aluminum alloy, aluminum is disadvantageously deposited on a rake face of such a CBN sintered body, to cause chipping.

Therefore, if a diamond or CBN sintered body is employed for simultaneously working an aluminum alloy and cast iron, which are materials increasingly applied to automobile components, for example, the life of the sintered body is disadvantageously reduced.

SUMMARY OF THE INVENTION

An object of the present invention is to provide a hard sintered body cutting tool, the tool life of which can be further increased.

According to a first aspect of the present invention, a hard sintered body cutting tool comprises a first sintered body layer containing at least 80 percent by volume and less than 98 percent by volume of diamond with a remainder being a first binder containing at least one material, which is selected from a group of carbides, nitrides and borides of transition metals belonging to the groups IVb, Vb and VIb of the periodic table and solid solutions and mixtures thereof, and an iron group or group VIII metal, and a second sintered body layer containing at least 30 percent by volume and less than 75 percent by volume of cubic boron nitride with a remainder being a second binder containing at least 5 percent by weight and less than 40 percent by weight of Al and at least one Ti compound which is selected from a group of TiC, TiN, TiCN, (Ti, any of transition metals, excluding Ti, belonging to the groups IVb, Vb and VIb of the periodic table)C, (Ti, any of transition metals, excluding Ti, belonging to the groups IVb, Vb and VIb of the periodic table)N and (Ti, any of transition metals, excluding Ti, belonging to the groups IVb, Vb and VIb of the periodic table)CN. The first and second sintered body layers so define a cutting edge portion that a major surface of the first sintered body layer forms a rake face and the second sintered body layer forms a flank. The thickness of the first sintered body layer is at least 0.02 mm and less than 0.1 mm, while the thickness ratio of the first sintered body layer to the second sintered body layer is at least 1:5.

The rake face is formed by the major surface of the first sintered body layer containing diamond, which exhibits excellent deposition resistance and chipping resistance in cutting of an aluminum alloy etc., while the flank is formed by the second sintered body containing cubic boron nitride, which has excellent flank wear resistance in cutting of cast iron etc., whereby chipping resistance of the rake face is improved by the first sintered body layer and wear resistance of the flank is improved by the second sintered body layer. Thus, it is possible to suppress progress of local wear and chipping, thereby increasing the life of the cutting tool as compared with the prior art.

The thickness of the first sintered body layer is set in the range of at least 0.02 mm and less than 0.1 mm since flank wear may undesirably take place to an extent exceeding the thickness of the first sintered body layer if the thickness thereof is less than 0.02 mm, while flank wear easily undesirably progresses in a surface intersecting with the major surface of the first sintered body layer if the thickness thereof exceeds 0.1 mm.

The amount of diamond contained in the first sintered body is set in the range of at least 80 percent by volume and less than 98 percent by volume since the content of the binder is relatively increased which reduces deposition resistance and chipping resistance if the diamond content is less than 80 percent by volume, while the amount of the first binder is reduced and its function as a solvent is rendered insufficient whereby diamond particles are insufficiently bonded with each other thereby reducing the toughness of the sintered body, if the diamond content exceeds 98 percent by volume.

The first binder contained in the first sintered body layer contains at least one material, being selected from a group of carbides, nitrides and borides of transition metals belonging to the groups IVb, Vb and VIb of the periodic table, which are excellent in affinity for diamond, and solid solutions and mixtures thereof, and a ferrous metal.

On the other hand, the amount of cubic boron nitride (CBN) contained in the second sintered body layer is set in the range of at least 30 percent by volume and less than 75 percent by volume since the content of the binder is relatively increased which reduces strength and hardness of the sintered body and hence accelerates the progress of mechanical wear when the cutting tool is adapted to cut a hard ferrous material or an aluminum material containing a large amount of Si, if the CBN content is less than 30 percent by volume, while bonding strength between cubic boron nitride particles and the second binder is reduced which reduces wear resistance, if the CBN content exceeds 75 percent by volume.

Further, the amount of Al contained in the second binder is set in the range of at least 5 percent by weight and less than 40 percent by weight since reaction between the second binder and the CBN is so insufficient that holding power of the second binder for the CBN is reduced if the Al content is less than 5 percent by weight. On the other hand, the amount of a product such as $AlB_2$ formed after sintering is increased with relative reduction in amount of the Ti compound, which is excellent in wear resistance, to cause insufficient wear resistance if the Al content exceeds 40 percent by weight.

The foregoing and other objects, features, aspects and advantages of the present invention will become more apparent from the following detailed description of the present invention.

DESCRIPTION OF THE PREFERRED EMBODIMENTS AND OF THE BEST MODE OF THE INVENTION

In order to confirm the aforementioned effect of the present invention, the inventors have made the following Examples:

chined so as to form flanks with thicknesses shown in Table 1, thereby preparing tips for cutting tools.

These tips were adapted to cut workpieces having respective first halves of internal diameters being made of ductile cast iron and respective second halves made of an aluminum-Si alloy. Such cutting tests were made under conditions of cutting speeds of 400 m/min., depths of cut of 0.15 mm and feed rates of 0.08 mm/rev. with coolant. The workpieces were cut for 20 minutes, whereby results of flank wear widths and presence/absence of chipping were determined as shown in Table 1. Referring to Table 1, Nos. a-1 to a-8 represent inventive samples, and Nos. a-9 to a-16 represent comparative samples.

TABLE 1

| | (a-1 to a-8: Inventive Samples, a-9 to a-16: Comparative Samples) | | | | | |
|---|---|---|---|---|---|---|
| Sample No. | Composition of Second Layer | CBN (v %) | Thickness of First Layer | Thickness of Second Layer | Flank Wear Width (mm) | Chipping |
| a-1 | 6Al—TiC | 45 | 0.04 | 0.6 | 0.12 | No |
| a-2 | 6Al—TiCN | 50 | 0.08 | 0.4 | 0.10 | No |
| a-3 | 15Al-(Ti,Hf)C | 60 | 0.02 | 0.5 | 0.13 | No |
| a-4 | 15Al—TiN | 35 | 0.05 | 0.5 | 0.09 | No |
| a-5 | 30Al—TiC | 65 | 0.04 | 0.7 | 0.11 | No |
| a-6 | 38Al-(Ti,Hf)C | 73 | 0.08 | 0.7 | 0.15 | No |
| a-7 | 38Al-(Ti,Ta)C | 60 | 0.03 | 0.4 | 0.13 | No |
| a-8 | 20Al-(Ti,W)N | 40 | 0.05 | 0.5 | 0.10 | No |
| a-9 | 15Al-(Ti,Ta)C | 80 | 0.04 | 0.7 | 0.25 | No |
| a-10 | 20Al—TiCN | 25 | 0.08 | 0.7 | at least 0.2 | Yes |
| a-11 | 20Al—$Si_3N_4$ | 55 | 0.05 | 0.5 | 0.42 | No |
| a-12 | 15Al—TiN | 60 | 0.02 | 0.09 | at least 0.2 | Yes |
| a-13 | 20Al—TiC | 70 | 0.12 | 0.8 | 0.35 | No |
| a-14 | 30Al-(Ti,Hf)C | 50 | 0.01 | 0.6 | at least 0.2 | Yes |
| a-15 | 45Al—55(Ti,Mo)N | 40 | 0.03 | 0.4 | 0.19 | No |
| a-16 | 2Al—98TiC | 70 | 0.04 | 0.6 | at least 0.2 | Yes |

EXAMPLE 1

As raw material powder for first sintered body layers, diamond powder of 10 μm mean particle diameter and first binder powder of WC and Co were prepared and blended with each other in a volume ratio of 9:1. Thus, raw material powder for first sintered body layers, by hereinafter referred to as first layers was obtained.

Then, binder powder materials having compositions shown in Table 1 and CBN powder materials of 3 μm mean particle diameter were prepared. These materials were uniformly mixed with each other in a pot using a ball of cemented carbide, to obtain raw powder materials for second sintered body layers, hereinafter referred to as second layers.

Thereafter discs of cemented carbide were introduced into Mo vessels, which in turn were charged with the raw powder materials for the second layers and those for the first layers so that the as-formed first and second layers had thicknesses shown in Table 1. Then the vessels were introduced into very high pressure/high temperature apparatuses, and sintered under conditions of a pressure of 50 kb and a temperature of 1450° C. for 20 minutes.

The as-obtained sintered bodies were inspected whereby it was observed that sintered bodies having double layer structures of first and second layers corresponding to the aforementioned types of mixed powder materials were strongly bonded onto cemented carbide materials. The first layers were machined so that major surfaces thereof formed rake faces with thicknesses shown in Table 1 while the second layers were ma-

EXAMPLE 2

Diamond powder materials and binder powder materials shown in Table 2 were prepared as raw powder materials for first sintered body layers.

Then, TiC powder and aluminum powder were blended with each other in a weight ratio of 75:25 to obtain binder powder, which in turn was further blended with CBN powder in a volume ratio of 40:60. The as-obtained powder was uniformly mixed in a pot with a ball of cemented carbide, to obtain raw material powder for second sintered body layers.

Thereafter discs of cemented carbide were introduced into Mo vessels, which in turn were charged with the raw powder materials for the second sintered body layers and those for the first sintered body layers. Thereafter these vessels were introduced into very high pressure/high temperature apparatuses, and sintered under a pressure of 50 kb and a temperature of 1500° C. for 30 minutes.

The as-obtained sintered bodies were inspected, whereby it was observed, that sintered bodies having double layer structures of first and second sintered body layers corresponding to the aforementioned types of mixed powder materials were strongly bonded onto cemented carbide materials. The first sintered body layers were machined so that major surfaces thereof formed rake faces while the second sintered body layers were machined so as to form flanks, thereby forming tips for cutting tools.

These tips were adapted to mill surfaces formed by an aluminum-Si alloy and gray cast iron in a ratio of 9:1 in sectional area. Such cutting operations were performed under conditions of cutting speeds of 180 m/min., depths of cut of 0.35 mm, and feed rates of 0.2 mm/rev. with coolant. Table 2 shows results of cutting pass frequencies up to chipping under the aforementioned cutting conditions. Referring to Table 2, Nos. b-1 to b-5 represent inventive samples, and Nos. b-6 to b-8 represent comparative samples.

TABLE 2

(b-1 to b-5: Inventive Samples, b-6 to b-8: Comparative Samples)

| Sample No. | Composition to First Binder | Diamond Content (v %) | Cutting Pass Frequency |
|---|---|---|---|
| b-1 | 25(W, Ta)C—75Co | 93 | 38 |
| b-2 | 30WC—70Co | 88 | 60 |
| b-3 | 13MoC—87Ni | 90 | 45 |
| b-4 | 10TiCN—90Co | 95 | 47 |
| b-5 | 5WB$_2$—5TiN—90Co | 83 | 50 |
| b-6 | 100TiC | 85 | 8 |
| b-7 | 30WC—70Co | 99 | 12 |
| b-8 | 13MoC—Ni | 75 | 15 |

Although the present invention has been described in detail, it is clearly understood that the same is by way of illustration and example only and is not to be taken by way of limitation, the spirit and scope of the present invention being limited only by the terms of the appended claims.

What is claimed is:

1. A hard sintered body cutting tool comprising:

a first sintered body layer containing at least 80 percent by volume and less than 98 percent by volume of diamond with a remainder being a first binder containing a metal of group VIII of the periodic table and containing at least one material selected from a group of carbides, nitrides and borides of transition metals belonging to the groups IVb, Vb and VIb of the periodic table and solid solutions and mixtures thereof; and a second sintered body layer containing at least 30 percent by volume and less than 75 percent by volume of cubic boron nitride with a remainder being a second binder containing at least 5 percent by weight and less than 40 percent by weight of Al and at least one Ti compound being selected from a group of TiC, TiN, TiCN, (Ti, any of transition metals, excluding Ti, belonging to the groups IVb, Vb and VIb of the periodic table)C, (Ti, any of transition metals, excluding Ti, belonging to the groups IVb, Vb and VIb of the periodic table)N and (Ti, any of transition metals, excluding Ti, belonging to the groups IVb, Vb and VIb of the periodic table)CN, said first and second sintered body layers defining an edge portion, a major surface of said first sintered body layer forming a rake face, said second sintered body layer forming a flank, said first sintered body layer being at least 0.02 mm and less than 0.1 mm in thickness, said first sintered body layer being in a thickness ratio of at least 1:5 to said second sintered body layer.

2. The hard sintered body cutting tool in accordance with claim 1, wherein said first binder contains a material selected from a group of (W,Ta)C—Co, WC—Co, MoC—Ni, TiCN—Co, and WB$_2$—TiN—Co.

3. The hard sintered body cutting tool in accordance with claim 1, wherein said Ti compound forming said second binder includes a material selected from a group of (Ti,Hf)C, (Ti,Ta)C and (Ti,W)N.

4. The hard sintered body cutting tool in accordance with claim 1, wherein Al contained in said second binder is contained in said second binder in a state of an Al compound.

* * * * *